United States Patent

Wakabayashi et al.

[15] 3,685,028

[45] Aug. 15, 1972

[54] PROCESS OF MEMORIZING AN ELECTRIC SIGNAL

[72] Inventors: Takashi Wakabayashi; Shiro Hozumi, both of Osaka, Japan

[73] Assignee: Matsushita Electric Industrial Co., Ltd., Osaka, Japan

[22] Filed: Aug. 20, 1970

[21] Appl. No.: 65,488

[52] U.S. Cl.......................340/173 R, 338/1, 338/20, 338/224

[51] Int. Cl.............................................G11c 11/00

[58] Field of Search..340/173 R, 173 CH; 338/1, 13, 338/20, 32, 224

[56] References Cited

UNITED STATES PATENTS 1,167,163 1/1916 Frank........................340/173

3,486,156 12/1969 Welch...........................338/1

*Primary Examiner*—Terrell W. Fears

*Attorney*—Wenderoth, Lind & Ponack

[57] ABSTRACT

A process of memorizing an electric signal. A memory element is provided which has finely divided conductive particles dispersed in resin and which has a high resistance state, a low resistance state and a memory state. An electric signal is supplied at a critical voltage to said memory element in the high resistance state for transforming said high resistance state into the low resistance state. An electric signal at a critical current is supplied to the memory element in the low resistance state for transforming said low resistance state into the memory state. The memory element in said memory state is heated to transform the memory state into said high resistance state.

12 Claims, 4 Drawing Figures

INVENTORS
TAKASHI WAKABAYASHI
SHIRO HOZUMI

BY Wenderoth, Lind & Ponack
ATTORNEYS

PROCESS OF MEMORIZING AN ELECTRIC SIGNAL

This invention relates to a process of memorizing an electric signal, and more particularly relates to the use of a memory element having finely divided conductive particles dispersed in resin.

There are known various conductive materials having finely divided conductive particles dispersed in organic resin. These conductive materials have been developed for use as conventional ohmic resistors or electrically conductive connectors between electrical components.

There is no disclosure in the prior art of the possibility of making a memory element from organic resin having finely divided conductive particles dispersed therein. The prior art memory elements which have a high resistance state are either crystalline based negative resistance devices on mechanical switches. It is difficult to form these existing memory elements into a film.

An object of the present invention is to provide a memory element having finely divided conductive particles dispersed in organic resin.

Another object of the present invention is to provide a process for memorizing an electric signal by using a memory element which has finely divided conductive particles dispersed in resin.

These objects are achieved by providing a memory element which has finely divided conductive particles dispersed in resin and which has a high resistance state, a low resistance state and a memory state. The process of memorizing an electric current by using such an element comprises supplying an electric signal at a critical voltage to said memory element while it is in the high resistance state whereby said high resistance state is transformed into the low resistance state, supplying an electric signal at a critical current to said memory element while it is in the low resistance state whereby said low resistance state is transformed into the memory state, and heating said memory element while it is in said memory state so that said memory state is transformed into said high resistance state.

These and other features of this invention will be apparent from the following detailed description taken together with the accompanying drawings, wherein FIG. 1 is a cross sectional view of an embodiment of a memory element according to the present invention;

Figure 1:
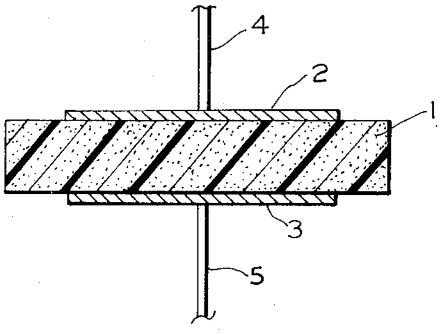

The construction of a memory element contemplated by this invention will be explained with reference to FIG. 1.

A conductive body 1 has finely divided conductive particles dispersed in resin. Two electrodes 2 and 3 are conductively attached to opposite surfaces of said conductive body 1. Two leads 4 and 5 are connected to said two electrodes 2 and 3, respectively by any available and suitable method. The construction shown in FIG. 1 can be modified to the construction shown in FIG. 2 wherein similar references designate components similar to those of FIG. 1. Two electrodes 6 and 7 are conductively attached to one surface of said conductive body 1.

Figure 4:
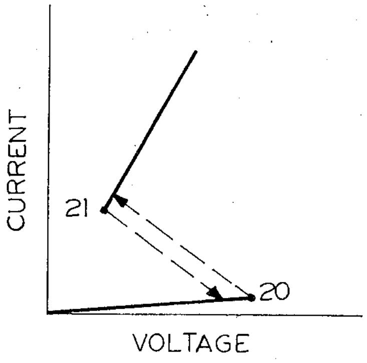
FIG. 4 is a graph illustrating exemplary voltage current characteristics of a memory element according to the present invention.

The memory element according to the present invention has three electric conduction states, a high resistance state, a low resistance state and a new voltage-current characteristic state depending upon the voltage applied across the two leads 4 and 5, as shown in FIG. 4. When the voltage applied across the memory element while it is in a high resistance state is increased up to a first critical value 30, the conduction state of the memory element is transformed quickly from the high resistance state to the low resistance state 40. After the transformation into the low resistance state, an increase in the voltage causes a high current to flow almost linearly through the conducting body and an increase in the current up to a critical value 50 causes the memory element to transform quickly from the low resistance state to the new voltage-current characteristic state 60. A decrease in the voltage results in an almost linear decrease in the current down to zero. This new voltage-current characteristic state is referred to hereinafter as the memory state. The voltage-current characteristic in the memory state is maintained even during repeated cycles of increasing and decreasing voltage and can be maintained for a long period in the absence of an applied voltage. The memory state can be transformed quickly into the high resistance state by heating the conductive body 1 at a temperature above the glass transition temperature of resin 12 in said conductive body 1. The glass transition temperature of the resin can be determined by the methods of dilatometory and differential thermal analysis.

The memory element according to the present invention can repeat the cycle of the transformation from the high resistance state through the low resistance state to the memory state.

The memory element according to the present invention can be operated by using a combination of pulses. A voltage pulse larger than the critical voltage 30 having a width ranging $10^{-6}$ to $10^{-4}$ second is applied to the element while it is in the high resistance state, so that the element is transformed quickly from the high resistance state to the low resistance state; furthermore, a current pulse larger than the critical current 50 having a width ranging $10^{-5}$ to $10^{-2}$ second is applied to the element in said low resistance state so that the element is transformed rather quickly from said low resistance state to the memory state.

The resin 12 has a great effect on the transition times for transformations from the high resistance state to the low resistance state and the low resistance state to the memory state. Furthermore, the resin 12 has a great effect on the stability during repeating cycles of the memorizing processes. A faster transition time and a higher stability can be obtained when the resin 12 has chlorine or bromine atoms incorporated therein. The incorporation of chlorine or bromine atoms can be achieved by using a mixture of organic resin and a chlorine or bromine compound or a chlorine or bromine resinous compound.

Preferable mixtures are as follows:

polyethylene, polystyrene, poly(methyl methacrylate), polyacetal, polycarbonate, polyamide, polyester, phenol-formaldehyde resin, epoxy resin, silicon resin, alkyd resin, polyurethane resin, polyimides resin, phenoxy resin, polysulfide resin and polyphenylene oxide resin. The materials can be used by themselves or can have admixed therewith a low molecular chloro or bromocompound such as chlorinated paraffine, chlorinated fatty ester, chlorinated fatty alcohol, chlorinated fatty amine, chlorinated amides, 1.2.3.-tribromopropane, 1.2-dibromochloropropane, 1.2.3.4-tetra bromobutane, 1.2-dibromo-1.1.2.2-tetrachloroethane, tris(2-chloroethyl) phosphite and perchloropentacyclodecane.

Preferably compounds for use in the resin are as follows:

1. chlorine or bromine-containing vinylpolymer such as polyvinyl chloride, polyvinyldenechloride, polyvinyldenechloride, polyvinyl bromide and poly(p-chlorostyrene),
2. chlorosubstituted polyolefine such as chlorinated poly-ethylene and chlorinated polypropylene,
3. chlorinated diene polymer such as chlorinated natural rubber,
4. chlorine or bromine-containing epoxy resins. Among those various resins, chlorinated natural rubber produces the best result.

The finely divided conductive particles preferably have an average particle size of 0.1 to 10 microns. The most preferred average particle size is 0.2 to 1 microns. The critical voltage and the critical current become unstable during repeated cycles when the particle size is less than 0.1 micron. On the contrary, when the average particle size is more than 10 microns, the resultant critical voltage and current deviate widely from the desired voltage and current. The average particle size is determined by the methods of sedimentation analysis and electron microscopy.

A preferred material for the finely divided conductive particles 11 is one member selected from the group consisting of silver, iron, copper, carbon black and graphite. Among those materials, silver particles give the best result.

Figure 3:
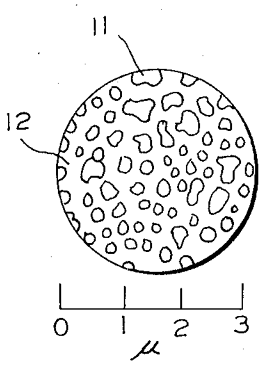
FIG. 3 is an enlarged partial cross section of a conductive body according to the present invention.

Referring to FIG. 3, finely divided conductive particles 11 are dispersed in resin 12. The distance between individual conductive particles 11 has a significant effect on the switching action of the element of this invention. Any conductive particles 11 which are in contact with other particles make no contribution to the switching action. A greater inter-particle distance produces a conductive body 1 having a higher electrical resistivity and makes the first critical voltage higher. An electron microscopic observation indicates that a distance of 500 to 10,000A is operable for accomplishing switching action. The distance is dependent upon the average particle size of the finely divided conductive particles, the volume of finely divided conductive particles relative to the volume of the resin, and the distribution of finely divided conductive particles in the resin. The percentage of the total volume of resin and particles occupied by finely divided conductive particles is determined by the specific gravity of the finely divided conductive particles and the resin and the average particle size of the finely divided conductive particles. For example, when silver particles having an average particle size of 0.5 microns are dispersed in resin, the percentage of the volume occupied by silver particles is 20 to 10 percent and that by resin is 80 to 90 percent. When carbon black having an average particle size of 0.25 microns is dispersed in resin, the percentage of the volume occupied by carbon black is 6 to 25 percent and that by resin is 94 to 75 percent.

A conductive body 1 according to the present invention can be formed by any available and suitable manner. A given amount of resin is dissolved in any suitable solvent. The amount of solvent is chosen so that the resulting solution has a viscosity of about 10 poise. Finely divided conductive particles in the desired amount are added to the solution. The amount of finely divided conductive particles must be such as to occupy the desired percentage volume relative to the resin. The mixture is mixed well by any suitable method, for example a ball mill, to produce a homogeneous paint having finely divided conductive particles dispersed uniformly in the solution. The homogeneous paint is applied to any suitable substrate acting as an electrode and is heated to evaporate the solvent. The cured paint is provided, at one surface, with another electrode by any suitable method, for example, vacuum metal deposition or application of conductive ink.

Another method for preparing the conductive body is to heat said homogeneous paint for achieving evaporation of the solvent. The heated paint is a homogeneous mixture of finely divided conductive particles and resin. The homogeneous mixture is treated to form a film according to well known plastic film forming technology or to form a thin plate according to a well known plastic molding method. The film or thin plate is provided, on opposite surfaces, with electrodes by any suitable method, for example, vacuum metal deposition or application of conductive ink.

EXAMPLE 1

Figure 2:
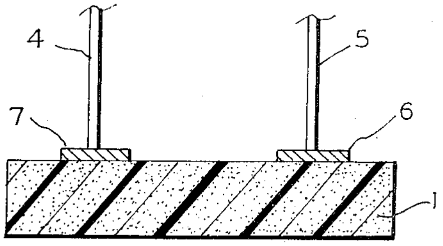
FIG. 2 is a cross sectional view of another embodiment of a memory element according to the present invention.

A series of elements are prepared each having a different proportion of conductive material. One weight portion of chlorinated natural rubber having 60 weight percent of chlorine incorporated therein is dissolved in 10 weight portions of ortho dichloro-benzene. Silver powder having an average particle size of 0.5 microns is dispersed uniformly in the solution to form a homogeneous paint. The weight percentages of silver powder and chlorinated natural rubber are adjusted to be 30 to 80 percent and 70 to 30 percent, respectively for the different elements. The homogeneous paint is applied to alumina substrate and is heated at 170° C for 1 hour. The heated paint is provided with two aluminum electrodes as shown in FIG. 2 by a vacuum deposition method. The conductive body 1 has a thickness of 0.15mm, and a width of 5mm. The distance between the two electrodes is 0.2mm. Two leads are connected to the two electrodes by using a conventional conductive adhesive.

Silver powder in an amount greater than 58 weight percent is found to form a conventional conductive body having only a low resistance state. Silver powder in an amount less than 43 weight percent is found to form an insulating body having a high electrical resistance similar to that of chlorinated natural rubber. Silver powder in an amount of 43 to 58 weight percent is found to form a memory element having both a high resistance state and a memory state according to the present invention. Table 1 shows the electrical properties of the memory elements formed as described above.

TABLE 1

| Weight % of Silver powder | Critical voltage (v) | Critical current (mA) | Electrical resistance in Memory State (Ω) |
|---|---|---|---|
| 43 | 120 | 0.5 | $1\times10^6$ |
| 50 | 20 | 1 | $5\times10^4$ |
| 55 | 5 | 2 | $1\times10^3$ |
| 58 | 0.02 | 0.5 | $2\times10^2$ |

These memory elements have an electrical resistance higher than $10^9\Omega$ in the high resistance state. These memory elements at room temperature remain in the memory state in the absence of applied voltage more than a few hours. The memory state is transformed to the high resistance state within a minute by heating the element to 120° C, a temperature above the glass transition temperature of 115° C of the chlorinated natural rubber used in this example.

EXAMPLE 2

The following materials of Table 2 are used as finely divided conductive particles:

TABLE 2

| Material | | Silver | Carbon black | Iron | Copper |
|---|---|---|---|---|---|
| Average particle size(μ) | | 0.5 | 0.25 | 3 | 5 |
| Weight percent(%) | | 55 | 9.1 | 65 | 60 |
| Critical voltage(v) | | 5 | 3 | 8 | 10 |
| Critical current(mA) | | 2 | 0.1 | 0.5 | 0.2 |
| electrical resistance (Ω) | in high resistance state | $2\times10^{10}$ | $1\times10^{10}$ | $5\times10^{10}$ | $5\times10^{11}$ |
| | in memory state | $1\times10^3$ | $5\times10^5$ | $5\times10^4$ | $1\times10^5$ |

Memory elements using these materials are prepared in a manner similar to that of Example 1. Table 2 shows the electrical properties of those memory elements.

EXAMPLE 3

The finely divided conductive particles used are silver powder having an average particle size of 0.2, 0.5, 1 and 10 microns respectively. The weight percentages of silver are shown in Table 3.

TABLE 3

| | | | | | |
|---|---|---|---|---|---|
| Average particle size(μ) | | 0.2 | 0.5 | 1 | 10 |
| Weight percent(%) | | 40 | 50 | 65 | 93 |
| Critical voltage(v) | | 3 | 20 | 25 | 40 |
| Critical current (mA) | | 1.5 | 1 | 0.4 | 0.5 |
| Electrical resistance (Ω) | in high resistance state | $1\times10^{10}$ | $2\times10^{10}$ | $5\times10^{10}$ | $1\times10^{10}$ |
| | in memory state | $5\times10^3$ | $5\times10^4$ | $1\times10^5$ | $1\times10^5$ |

The memory elements including these silver powders are prepared in a manner similar to that of Example 1 and have electrical properties shown by Table 3.

EXAMPLE 4

Silver powder having an average particle size of 0.5 microns is dispersed in various resins listed in Table 4. The weight percentage of both the silver powder and the resin is 50 percent.

TABLE 4

| Resin | Critical voltage (v) | Critical current (mA) | Electrical resistance high state (Ω) | Electrical resistance memory state (Ω) |
|---|---|---|---|---|
| Polyvinyldene chloride | 15 | 2 | $4\times10^{10}$ | $1.5\times10^4$ |
| Chlorinated polyethylene (chlorine content 40%) | 25 | 3 | $5\times10^{10}$ | $2\times10^4$ |
| Polystyrene 75wt% Chlorinated paraffine ($C_{24}H_{29}Cl_{21}$) 25wt% | 18 | 2 | $1\times10^{10}$ | $1.5\times10^4$ |
| Polystyrene 90wt% Methylester of pentachlorostearicacid 10wt% | 10 | 1.5 | $1\times10^9$ | $8\times10^3$ |
| Poly methyl methacrylate 80wt% 1.2-Bromo-1.1.2.2-tetrachloroethane 20wt% | 7 | 0.5 | $5\times10^9$ | $5\times10^4$ |

Various memory elements are prepared in a manner similar to that of Example 1. Table 4 shows the electrical properties of the resultant memory elements.

What is claimed is:

1. A process of memorizing an electric signal, which comprises providing a memory element comprising resin having finely divided conductive particles dispersed therein and which has a high resistance state, a low resistance state and a memory state, supply an electric signal at a critical voltage to said memory element while it is in the high resistance state, whereby said high resistance state is transformed into the low resistance state, supplying an electric signal at a critical current to said memory element while it is in the low resistance state, whereby said low resistance state is transformed into the memory state, and heating said memory element while it is in said memory state so that said memory state is transformed into said high resistance state.

2. A process as claimed in claim 1 wherein said heating step comprises heating the element to a temperature above the glass transition temperature of said resin.

3. A process of memorizing an electric signal as claimed in claim 1, wherein said finely divided conductive particles have an average particle size of 0.1 to 10 microns.

4. A process of memorizing an electric signal as claimed in claim 1, wherein said finely divided conductive particles are a material selected from the group consisting of silver, iron, copper carbon black and graphite.

5. A process of memorizing an electrical signal as claimed in claim 4, wherein said finely divided conductive particles are silver powder having an average particle size of 0.2 to 1 micron.

6. A process of memorizing an electric signal as claimed in claim 1, wherein said finely divided conductive particles are spaced from each other an average distance of 500A to 10,000A from each other.

7. A process of memorizing an electric signal as claimed in claim 1, wherein said resin consists essentially of one member selected from the group consisting of (1) chlorine or bromine-containing vinylpolymer; (2) chlorosubstituted polyolefine; (3) chlorinated diene polymer; and (4) chlorine of bromine-containing epoxy resins.

8. A process of memorizing an electrical signal as claimed in claim 7, wherein said resin is chlorinated natural rubber.

9. A process of memorizing an electrical signal as claimed in claim 7 wherein said vinylpolymer is one taken from the group consisting of polyvinyl chloride, polyvinyldenechloride, polyvinyl bromide, and poly(p-chlorostyrene).

10. A process of memorizing an electrical signal as claimed in claim 7 wherein said chlorosubstituted polyolefine is one taken from the group consisting of polyethylene and chlorinated polypropylene.

11. A process of memorizing an electric signal as claimed in claim 1, wherein said resin has incorporated therein atoms taken from the group consisting of chlorine and bromine.

12. A process of memorizing an electric signal as claimed in claim 11, wherein said resin consists essentially of one member selected from the group consisting of (a) polyethylene, (b) polystyrene, (c) poly(methylmethacrylate), (d) polyacetal, (e) polycarbonate, (f) polyamide, (g) polyester, (h) phenol-formaldehyde resin, (i) epoxy resin, (j) silicon resin, (k) alkyd resin, (l) polyurethane resin, (m) polyimide resin, (n) phenoxy resin, (o) polysulfide resin, (p) polyphenylene oxide resin, and (q) one of the members *a, b, c, d, e, f, g, h, i, j, k, l, m, n, o* and *p* having admixed therewith at least one member reheated from the group consisting of chlorinated paraffine, chlorinated fatty ester, chlorinated fatty alcohol, chlorinated fatty amine, chlorinated amides, 1.2.3-tribromopropane, 1.2-dibromochloropropane, 1.2.3.4-tetra bromobutane, 1.2-dibromo-1.1.2.2-tetrachloroethane tris (2-chloroethyl) phosphite and perchloropentacyclodecane.

* * * * *